(12) United States Patent
Ahmed et al.

(10) Patent No.: US 10,935,944 B2
(45) Date of Patent: Mar. 2, 2021

(54) VARIABLE AIR VOLUME MODELING FOR AN HVAC SYSTEM

(71) Applicant: Siemens Industry, Inc., Alpharetta, GA (US)

(72) Inventors: Osman Ahmed, Hawthorn Woods, IL (US); Robert J. Cowan, Lake Forest Park, WA (US); Robertito Raymundo, Seattle, WA (US); James John Walker, Issaquah, WA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 16/506,824

(22) Filed: Jul. 9, 2019

(65) Prior Publication Data

US 2020/0004214 A1 Jan. 2, 2020

Related U.S. Application Data

(62) Division of application No. 14/871,651, filed on Sep. 30, 2015, now Pat. No. 10,386,800.

(Continued)

(51) Int. Cl.
*F24F 11/56* (2018.01)
*F24F 11/62* (2018.01)

(Continued)

(52) U.S. Cl.
CPC ............ *G05B 15/02* (2013.01); *F24F 11/30* (2018.01); *F24F 11/32* (2018.01); *F24F 11/46* (2018.01); *F24F 11/54* (2018.01); *F24F 11/56* (2018.01); *F24F 11/62* (2018.01); *F24F 11/72* (2018.01); *F24F 11/77* (2018.01); *G06N 20/00* (2019.01);

(Continued)

(58) Field of Classification Search
None
See application file for complete search history.

(56) References Cited

U.S. PATENT DOCUMENTS 8,423,322 B2 4/2013 Steinberg et al.
2011/0014061 A1 1/2011 Hopkins et al.
(Continued)

FOREIGN PATENT DOCUMENTS

GB 2365579 A * 2/2002 ............. G06F 30/15

OTHER PUBLICATIONS

European office action dated Apr. 29, 2020, for EP application 16708879.8, 5 pages.

Primary Examiner — Jennifer L Norton

(57) ABSTRACT

Methods for modeling heating, ventilation, and air conditioning (HVAC) are described. A heuristic model of air handling in a HVAC system is optimized by a server based on measurements from outdoor sensors, from building space sensors, plant sensors, and sensors for the air handling. Settings of the air handling in the HVAC system are determined by the server from the model as optimized and transmitted to the HVAC system. The heuristic model may be optimized by indicating a mismatch of a fan with a space based on a diversity from a fan flow set point and a fan designed maximum flow; identifying a rogue zone or a (Continued)

critical zone of air handling units based on a number of actuator re-positioning, box pressures, and box flow; and/or determining a coupling of a coupled zone operation with temperature, flow, or temperature and flow.

4 Claims, 13 Drawing Sheets

Related U.S. Application Data

(60) Provisional application No. 62/120,218, filed on Feb. 24, 2015.

(51) Int. Cl.
| | | |
|---|---|---|
| *F24F 11/63* | (2018.01) | |
| *F24F 11/72* | (2018.01) | |
| *F24F 110/00* | (2018.01) | |
| *G05B 15/02* | (2006.01) | |
| *F24F 11/30* | (2018.01) | |
| *F24F 11/32* | (2018.01) | |
| *F24F 11/46* | (2018.01) | |
| *F24F 11/54* | (2018.01) | |
| *F24F 11/77* | (2018.01) | |
| *G06N 20/00* | (2019.01) | |
| *F24F 140/60* | (2018.01) | |

(52) U.S. Cl.
CPC ........... *F24F 11/63* (2018.01); *F24F 2110/00* (2018.01); *F24F 2140/60* (2018.01); *Y02B 30/70* (2013.01)

(56) References Cited

U.S. PATENT DOCUMENTS

| | | | |
|---|---|---|---|
| 2012/0072181 A1* | 3/2012 | Imani | G06F 30/23 703/1 |
| 2013/0268125 A1* | 10/2013 | Matsuoka | F24F 11/62 700/276 |
| 2014/0067132 A1* | 3/2014 | Macek | F24F 11/30 700/276 |
| 2014/0142727 A1 | 5/2014 | Giering et al. | |
| 2014/0245762 A1* | 9/2014 | Schlesinger | F25B 49/02 62/89 |
| 2016/0258644 A1* | 9/2016 | Benosman | F24F 11/70 |
| 2017/0329357 A1* | 11/2017 | Torres | G05B 15/02 |
| 2018/0356775 A1* | 12/2018 | Harvey | G05B 13/048 |

* cited by examiner

VARIABLE AIR VOLUME MODELING FOR AN HVAC SYSTEM

CROSS-REFERENCE TO OTHER APPLICATIONS

This application claims the benefit of the filing date of U.S. Provisional Patent Application 62/120,218, filed Feb. 24, 2015, which is hereby incorporated by reference to the extent permitted by law. This application is a divisional, and claims the benefit, of U.S. patent application Ser. No. 14/871,651, filed Sep. 30, 2015, which is hereby incorporated by reference to the extent permitted by law.

TECHNICAL FIELD

The present embodiments relate generally to industrial process heating, ventilation, and air conditioning (HVAC) systems.

BACKGROUND

To distribute air in an HVAC system, an air distribution system, including air-handling units, move the air between the space to be ventilated and a plant. The air-handling units include fans for moving the air in zones, rooms, or other areas local to the occupant space.

The air handling is controlled by one or more controllers, such as controllers in a panel. Using a set of rules, the controller causes the air-handling units to provide more or less flow. For example, feedback from a temperature sensor is used to increase or decrease fan speed to drive the temperature to within a range of a set point. Due to poor design, wear, or other reasons, the air-handling unit may not operate optimally or may be incapable of sufficient operation. The rule-based control may not identify improper operation other through error reporting. For more complex air distribution systems with multiple interconnected air-handling units, the rule-based control may not deal with interactions between the air-handling units.

SUMMARY

Using information available from the controller or controllers of air-handling units, a remote server uses a heuristic model to determine settings for the air-handling units. Rather than just using rules for each air-handling unit, a model-based solution determines the settings. The model is used to optimize operation of the air distribution. In additional or alternative embodiments, measurements are gathered and used to derive analytics. The measurements may include data not otherwise used for rule-based control of the air handling unit. The analytics are used to predict needs, as inputs to the modeling, identify problems, and/or identify opportunities.

In a first aspect, a method is provided for modeling heating, ventilation, and air conditioning (HVAC). A server optimizes a model of air handling in a HVAC system based on measurements from sensors. The server determines settings of the air handling in the HVAC system from the model as optimized and transmits the settings to the HVAC system. The heuristic model may be optimized by determining a diversity from a fan flow set point and a fan designed maximum flow, and indicating a mismatch of a fan with a space based on the diversity.

In a second aspect, a method is provided for analytics in heating, ventilation, and air conditioning (HVAC). Operation of an air-handling unit in an HVAC system is measured. The measurements include fan speed, pressure, power input, and flow. The measurements are transmitted from the measuring to a processor. The processor analyzes the operation of the air-handling unit from a combination of two or more of the fan speed, pressure, power input, or flow. A problem or opportunity for the air-handling unit is presented on a display based on a result of the analyzing.

In third and fourth aspects, methods are provided for modeling heating, ventilation, and air conditioning (HVAC). A server optimizes a model of air handling in a HVAC system based on measurements from sensors. The server determines settings of the air handling in the HVAC system from the model as optimized and transmits the settings to the HVAC system. For the third aspect, the heuristic model may be optimized by identifying a rogue zone or a critical zone of air handling units based on a number of actuator re-positioning, box pressures, and box flow. For the fourth aspect, the heuristic model may be optimized by determining a coupling of a coupled zone operation with temperature, flow, or temperature and flow.

Other systems, methods, and/or features of the present embodiments will become apparent to one with skill in the art upon examination of the following FIGS. and detailed description. It is intended that all such additional systems, methods, features, and advantages be included within this description, be within the scope of the invention, and be protected by the accompanying claims. Additional features of the disclosed embodiments are described in, and will be apparent from, the following detailed description and the FIGS.

BRIEF DESCRIPTION OF THE FIGURES

The components in the FIGS. are not necessarily to scale, emphasis instead being placed upon illustrating the principles of the embodiments. In the FIGS., like reference numerals designate corresponding parts throughout the different views.

DESCRIPTION OF SOME EMBODIMENTS

The description below is for variable air volume control, but may be used for other processes for HVAC. A model-based approach in variable air volume may be a cost effective implementation. This may result in a high-value solution that improves operational performance.

In one aspect, statistical processing, physics-based modeling, a classical method of optimization, or a learning algorithm is provided for on-line optimization. The HVAC is controlled based on optimization in the cloud by a remote server. The controller or controllers of the HVAC system are connected through a network, such as an intranet or the Internet, to the remote server. The server provides a cloud service for controlling the HVAC system. Various measures are provided from sensors and/or the controllers to the server as the HVAC system operates. The measures indicate the characteristics of the HVAC system. Analytics may be applied by the server to observe the operating points (e.g., actual operation and set points) to establish the behavior of the HVAC system through modeling. Optimum set points, operation, or other control for the HVAC system are determined and provided from the server to the HVAC system. Predictions of future behavior based on the current behavior may be made and used to schedule maintenance, establish control now to alter the expected performance or avoid undesired situations, or otherwise used to reset the operation of the HVAC system.

Analytics of the operation are used as feedback for the modeling. Alternatively or additionally, analytics are used to indicate trends, efficiency, problems, or opportunities. Given various measures, the operation of the air handling may be analyzed to identify changes in design, more optimum occupancy assignment, diagnostic information, maintenance information, or other information useful for monitoring air distribution.

Figure 1:
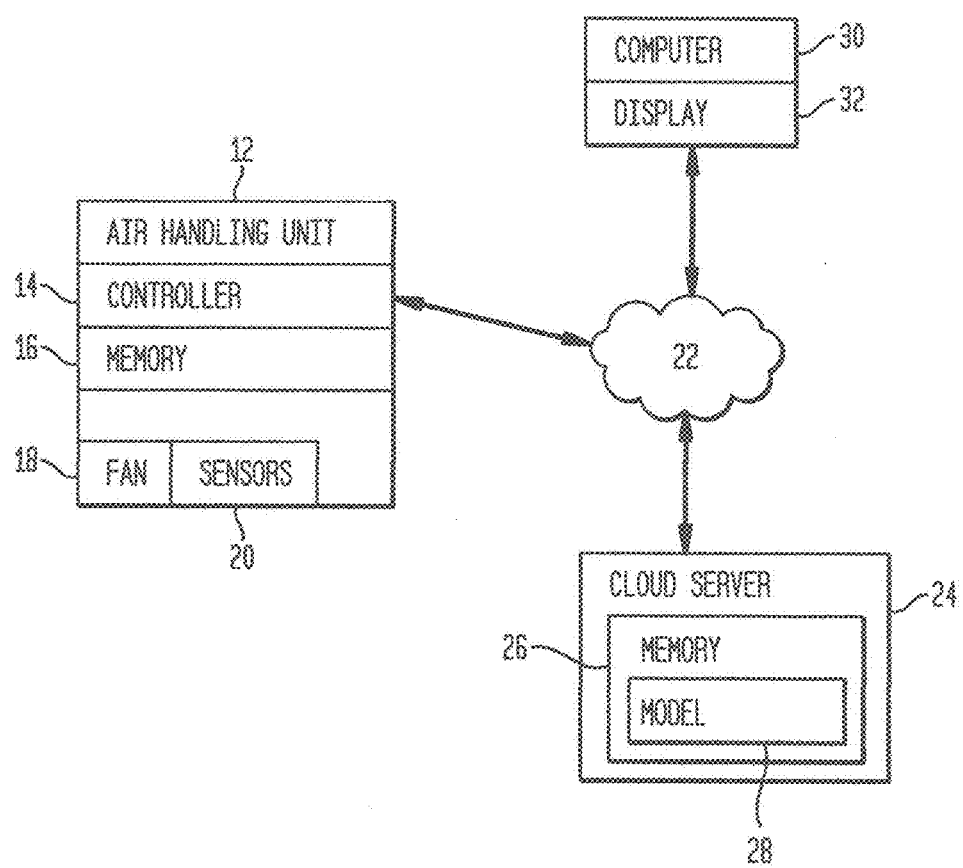
FIG. 1 is a block diagram of one embodiment of a control system for air handling in HVAC.

FIG. 1 shows one embodiment of a control system for HVAC. The system uses a remote or cloud server with heuristic modeling to determine settings for air handling in an HVAC system. The heuristic modeling uses a physics-based model or a machine-learnt model to provide the settings given current and/or current and past operation of the air handling. Alternatively or additionally, the control system performs analytics that may be used for maintenance, predictive operation, diagnosis, or other indication of a problem or opportunity in the air distribution.

Figure 13:
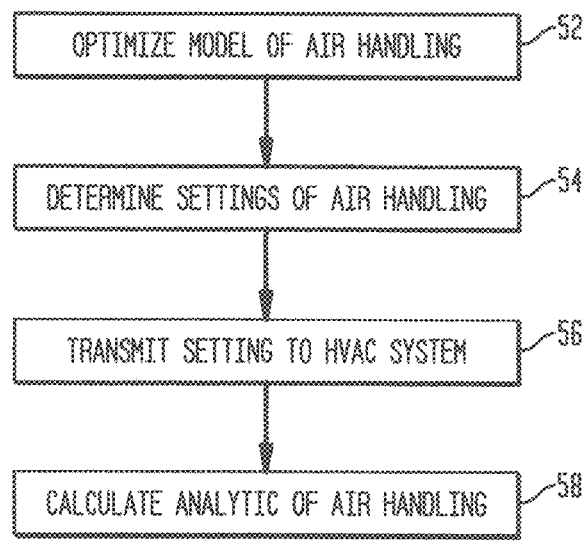
FIG. 13 is one embodiment of a method for HVAC control using a heuristic model.
Figure 14:
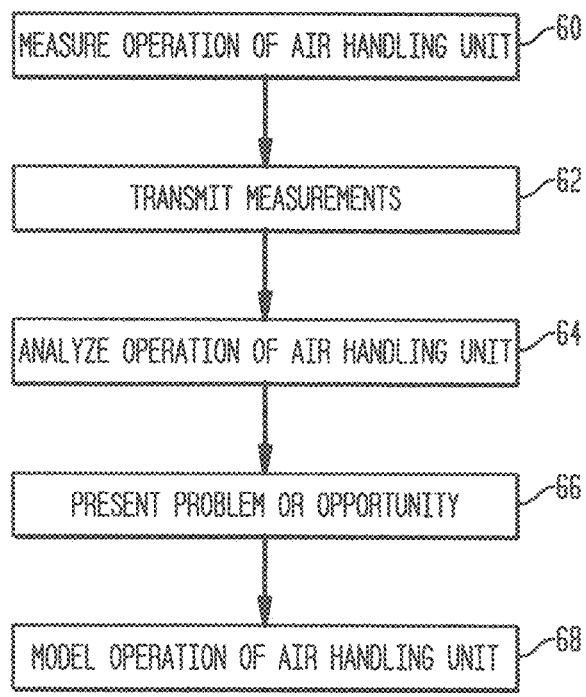
FIG. 14 is one embodiment of a method for HVAC analytics.

The control system implements one or both methods of FIGS. 13 and 14. Other methods may be implemented.

The control system includes an air-handling unit 12, a network 22, a cloud server 24, and a computer 30. Additional, different, or fewer components may be provided. For example, any number of air-handling units is provided, such as tens or hundreds. As another example, the computer 30 is implemented as part of the controller 14 of the air-handling unit 12 rather than being a stand-alone device or is not provided. In another example, different HVAC air handling systems with corresponding air-handling units 12 connect through the network 22 with the cloud server 24.

Figure 2:
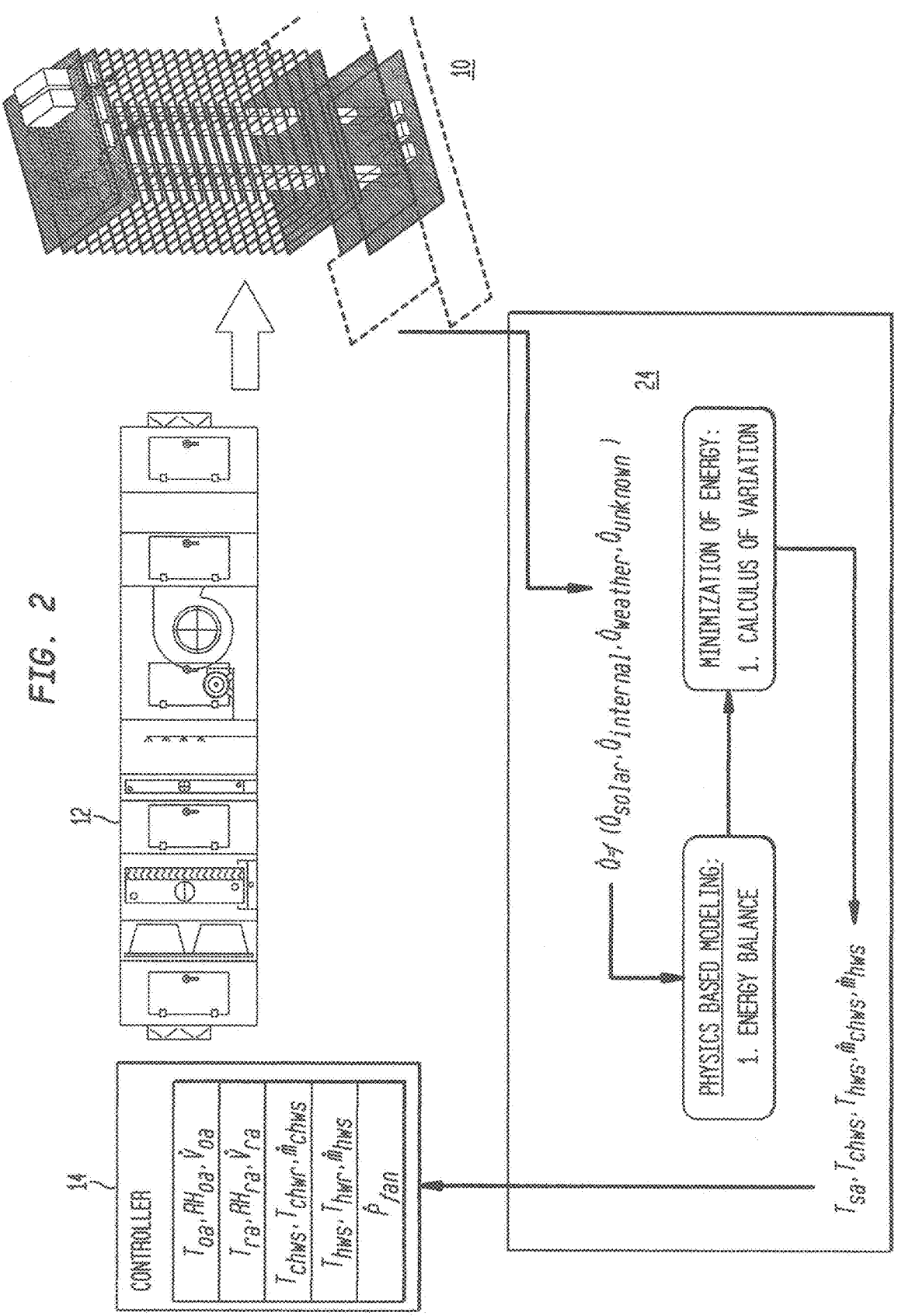
FIG. 2 illustrates an example control system with an air-handling unit.

FIG. 2 shows one embodiment of the control system of FIG. 1 where the heuristic model is a physics-based model directed to minimizing energy usage in a floor or zone in a building 10. Data for previous operation is gathered to represent past behavior. In the example shown, the controller 14 receives the data from sensors, calculates the data from other information, and/or uses the data for control or operation of the air-handling unit 12. T represents a temperature, RH represents relative humidity, V represents volume flow, P represents input power, Q represents heat, and m represents mass flow. The oa subscript denotes outside air, the ra subscript denotes return air, the chws subscript denotes chilled water supply, the hwr subscript denotes chilled water return, the sa subscript denotes supply air, and the fan subscript denotes the fan 18.

In the example of FIG. 2, the controller 14 provides the various operational data of the air-handling unit 12 of the building 10 to the server 24. The load and/or measures of temperature, volume, return handling, mass flow, fan pressure, or other information are measured and applied by the physics-based modeling for the HVAC system. Additional, different, or fewer values for may be gathered or used by the controller 14 or the server 24.

The server 24 calculates or is provided with the heat calculated as a function of the solar heat, internal heat, weather, and any other heat sources. The heat for the volume or zone for the air-handling unit 12 is calculated. Other indications of operation of the air-handling unit 12 than heat may be used. Based on a physics model, the heat and past settings or measurements are used to fit the model to the specific air-handling unit. The solution may include a cost function, such as minimization of energy by calculus of variation of the parameters of the model (e.g., searching for combinations of the input parameters that result in the calculated heat while minimizing energy usage). Other costs may be used. Based on solving the model for minimum energy, the set points for the supply air temperature $T_{sa}$, chilled water supply temperature $T_{chws}$, chilled water return temperature $T_{hwr}$, chilled water mass flow $m_{chws}$, and return water mass flow $m_{hws}$ are determined and provided to the controller 14 for further use.

Returning to FIG. 1, the air-handling unit 12 is any now know or later developed air-handling unit for residential, industrial, or office use. The air-handling unit 12 includes return air input, fresh air input, air mixing section, filters, cooling coils, heating coils, dampers or actuators, attenuator, discharge, and one or more fans 18. Additional, different, or fewer components may be provided. For example, the air-handling unit 12 is a box with a damper and the fan 18 without filters, mixing section, attenuators, heating coils, and/or cooling coils. The heating coil and cooling coils are connected by pipes for chilled and heated water supply and return. Heating and/or cooling without water may be provided.

The fan 18 for air distribution is any fan for forcing air to a zone. The fan 18 includes a blade and a motor. Any blade may be used. Any motor may be used. In one embodiment, the motor is a variable drive, such as a variable frequency drive (VFD). In response to a control signal, such as in response to a frequency, duty cycle, amplitude, or other signal characteristic, the motor controls the speed of the fan 18. Change in the speed of the fan 18 causes greater or lesser airflow. Alternatively or additionally, an actuator controls a damper for increasing and/or decreasing the airflow. The change in airflow by the fan 18 may be used to more closely regulate temperature downstream of the fan in the air distribution.

The air-handling unit 12 includes one or more controllers 14. The controller 14 is a field panel, processor, computer, application specific integrated circuit, field programmable gate array, analog circuit, digital circuit, or other controller. A single controller 12 is shown, but an arrangement of different controllers may be used. For example, different controllers are provided for different components (e.g., controller for the fan 18 different than the controller for the damper, heating coil, or cooling coil). The distributed controllers may communicate for interactive control, may be controlled by a master controller, and/or may operate independent of other control.

The memory 16 is a random access memory (RAM), read only memory (ROM), removable media, flash, solid state, or other memory. The memory 16 stores set points, sensor values, control information, and/or instructions for control by the controller 14. For example, the memory 16 is a non-transitory computer readable storage medium for storing instructions. When the physical controller 14 executes the instructions, the controls discussed herein are performed.

In another example, the memory 16 stores data acquired from the sensors 20, set points, or other operational measures of the air-handling unit 12. The stored data is used for controlling operation of the air-handling unit 12, such as temperature measures used for comparing to a temperature set point and fan speed settings for providing the conditioned air to the occupant space. The stored data may also include information not used in rule-based control of the air-handling unit 12, such as measures of pressure and/or input power.

The sensors 20 are for measuring temperature, relative humidity, fan speed, pressure, input power, and fan flow. Additional, different, or fewer types of sensors 20 may be used. Solid state or other sensors may be used. For example, the input power sensor is a power meter for the variable speed drive fan 18 and/or for the entire air-handling unit 12. One or more types of sensors may be emulated. For example, the fan speed uses a control value (e.g., frequency) used to control the fan 18 rather than measuring the speed. The expected speed given the speed setting is used. As another example, the fan flow is estimated based on the fan speed. Pressure may be modeled from the fan speed and modeled or previously measured resistance from the damper and downstream resistance sources.

One or more of each type of sensor is provided. Temperature sensors may be provided for the return air, fresh air, outdoor, exit air, at the fan, and/or other locations. Similarly, relative humidity sensors are provided for the return air and fresh air. In other embodiments, sensors remote from the air-handling unit 12 are used, such as obtaining outdoor temperature and relative humidity from a weather station or source over the network 22. Where a sensor 20 is not used for rule-based control, the sensor 20 may be retrofitted or added.

Either from the sensors 20 or other sources, the controller 14 gathers or collects data from or for the air-handling unit 12 and/or air distribution system. The collected data is also for operation of the air-handling unit 12 and/or may be gathered for other uses but not used in the rule-based operation of the air-handling unit 12 by the controller 14 without the modeling by the server 24. In one example, the measured data for a given air-handling unit 12 is fan flow, fan total pressure, power input (in kilowatts) from a variable speed drive for the fan, and fan rpm. Other measures may be used.

The network 22 connects with the controller 14 of the air-handling unit 12, the server 24, and the computer 30. The network 22 is a local area network, wide area network, enterprise network, cellular network, intranet, Internet, wireless, wired, or other network for TCP/IP or other communications. The network 22 may be used for various purposes unrelated to HVAC or may be a network dedicated to HVAC. While one network 22 is shown, a combination of multiple networks may be used. The network 22 provides for communication between the air-handling unit 12, the server 24, and/or the computer 30.

The server 24 is a processor, computer, card, or other server for processing and communicating with the air handling unit 12. The server 24 is remote from the air-handling unit 12, such as being in a different building, city, county, state, or country. Alternatively, the server 24 is a workstation in the same building, such as a workstation for overall management of an entire HVAC system. The server 24 is not in a same room or zone as the air-handling unit 12. In other embodiments, a workstation as a controller is used instead of the server 24.

The memory 26 of the server 24 is a same or different type of memory as the memory 16 of the controller. In one embodiment, the memory 26 is a database memory or other memory that is part of or accessible by the server 24.

The memory 26 is configured to store measurements from the sensors 20 and/or other data (e.g., set points and design specifications) of the air-handling unit 12. The data is provided over the network 22 to the memory 26. Alternatively, the memory 16 is accessed by the server 24 without storage of the data in a separate or server side memory 26. The memory 26, 20 at the HVAC system or at the server 24 stores measurements for use in the analysis by the cloud server 24.

Data from multiple devices may be stored. For modeling, the data is linked based on the HVAC system. The data from physically linked or related components of the HVAC system are labeled with the links. Alternatively, the data is labeled by source, and the memory 26 includes a schematic or other linking structure to associate data from related components. Any relationships may be used in linking data, such as physical relationships between devices. For example, sensors 20, actuators, controllers 14, and/or rooms, zones, or other building spaces for a same air-handling unit are linked. As another example, variable air volume boxes (e.g., AHU) are linked with building zones. In yet another example, devices used in a control loop or other control structure together are linked.

The memory 26 also stores one or more heuristic models 28. The heuristic model 28 represents the type of air-handling unit, but is to be fit to a specific air-handling unit 12 based on the data received from the air-handling unit 12. The fitting accounts for wear and tear, device operation within a tolerance range, effects of installation, or other considerations making a given air handling unit 12 unique despite being a same type. The heuristic model 28 is to be solved to fit the representation of operation to the actual operation. Rather than a rule-based (e.g., classical control) approach to control the HVAC system, the heuristic model 28 may be used to determine optimal or desired settings for operating. The heuristic model 28 is used to determine set points, which are then used by the controller 14 in the rule-based control.

The fitting relies on data used in rule-based control, including measurements, with or without data (e.g., other measurements, design specifications, and/or other information) not used as part of the rule-based control. For example, pressure is not used for controlling the air-handling unit by the controller 14 in any feedback loop without input from the model. The pressure is measured or calculated and used for fitting the model.

In this on-line optimization approach, the server 24 performs the heuristic operation to determine the values used for rule-based control. In other embodiments, the local controller 14 or controllers of the HVAC system perform the heuristic operation.

One example heuristic model 28 is a physics-based model. The inter-relationship between components is represented using physics. A group of equations, matrices, look-up tables of related variables, or combinations thereof is used to model the operation or behavior of the air-handling unit 12 or other air distribution. The entering and exiting air are represented as having a volume or mass flow, temperature, pressure, and/or other characteristics. These variables are used to relate the internal operation on the input air that results in the output air. Since the internal operation relies on devices (e.g., fan 18) specific to the air-handling unit 12, the modeling may be adjusted to account for specific devices based on the measurements of operation from the controller 14. For example, the efficiency of a fan is included in the model. The efficiency that results in the output air based on the input air measured for a given air handling unit 12 is determined for that specific fan 18. The effect of any damper on the fan 18 is modeled in solving for the characteristics of the fan 18, so damper characteristics are another variable or variables fit to the air handling unit 12.

In one embodiment, the physics-based model is a demand flow model. For example, the air-handling unit 12 is modeled as described in U.S. Published Patent Application No. 2011/0301766 for the control of chilled water in a chilled water system or in a hot water distribution system. The interrelationship of various components is modeled for control of the air handing unit 12 using Demand Flow considerations. Demand Flow reduces or eliminates Low Delta temperature (T) and improves efficiency. Demand Flow utilizes variable flow to address Low Delta T and to substantially increase the efficiency. Variable flow under Demand Flow maintains a Delta T for components where the Delta T is at or near the design Delta T for the components. As a result, Demand Flow substantially increases the operating efficiency, resulting in savings in energy costs. The increased efficiency provided by Demand Flow may also reduce pollution. Furthermore, Demand Flow may also increase the life expectancy of components by operating these components near or at their specified entering and leaving temperatures, or design Delta T, unlike traditional variable or other pumping techniques.

Demand Flow provides increased efficiency regardless of cooling or heating demand or load by operating components in a synchronous fashion. In one or more embodiments, this occurs by controlling pumps and/or fans to maintain a Delta T at particular components or points. In general, Demand Flow operates on individual components to maintain a Delta T across a particular component or point. The control of individual pumps or motors (and flow rate) in this manner results in synchronized operation. This synchronized operation balances flow rates, which significantly reduces or eliminates Low Delta T Syndrome and related inefficiencies.

This same demand flow model may be used as the physics-based model. Other physics-based models may be used.

To fit the generic physics-based model to the specific air-handling unit, the determination of the behavior and/or setting of the control is treated as an optimization problem. Using a neighborhood search, local minimization, other process, or combinations thereof, the operation is optimized. The measurements are used. Other data, such as design specification and analytics, may be used. The input measurements or data are used as boundary conditions in the solution. By altering one or more variables for the components of the air-handling unit 12, the model is altered to provide the measured output. The combination of characteristics modeled in the air handling unit that provided the outputs given the inputs over time are determined.

Once fit, the physics-based model may be used to determine optimal settings for control of the air handling unit. A variance calculus is used. The inputs are varied to find variance in the outputs using the fit model. The combination of inputs resulting in outputs best satisfying a criterion or criteria, such as minimizing energy usage, is determined using the fit model.

In an alternative embodiment, the heuristic model 28 is a machine-learnt classifier. Using data from the same air-handling unit and/or a large number of the same type of air-handling units, a classifier may be trained using machine learning to output optimized or desired settings given an input feature. The training data is annotated, providing a ground truth or actual output for the various examples. The machine learning learns to predict the output given the input features. Any input features may be used, such as measurements from the air-handling unit. Design specifications or other data may additionally or alternatively be used. The trained classifier models the behavior of the air-handling unit 12.

Given measured and other inputs, the classifier is trained to predict the results, such as output air characteristics. The classifier may predict a range of outputs given ranges of input set points. By iteratively testing different settings, the machine-learnt classifier may be used to find the settings with a desired result, such as least energy.

The machine learning uses clustering, probability distribution, neural networks, support vector machines, or other process to learn to predict the desired output given the input features. Any machine learning may be used, such as a genetic algorithm applying any kill/maintain criteria and/or a neural network. In one embodiment, a genetic algorithm in combination with a neural network is used to implement the machine learning. Other machine learning approaches may be used, such as a probabilistic boosting tree or Bayesian network.

In an alternative embodiment, training data is collected from representative HVAC systems with known optimum settings. Data using different settings for the systems are gathered. Machine learning is applied to train a classifier to receive input measures for a given HVAC system and output optimum settings. The classifier outputs optimized control settings for the given HVAC system based on the machine-learnt classifier. Other machine learning approaches may be used.

In one embodiment, the machine-learnt classifier uses on-line or ongoing learning. The classifier is trained, entirely or at least in part, on operation of the specific air handling unit. As the behavior of the HVAC system is determined, the behavior is used with on-line or ongoing machine learning. As results of changes in operation are gathered as a feedback mechanism, further machine learning specific to the HVAC system is performed. As further data is collected in response to different settings and results, the resulting feedback is used to learn further probabilities and/or distributions in an ongoing manner. The machine learning continues to learn the behavior of the given HVAC system. The learned behavior is used to determine settings for HVAC control that may be optimized. The machine learning provides probability distributions or other statistics that may be used to control operation of the HVAC system. The achievable operation is learned in order to best control the HVAC system.

The cloud server 24 is configured to receive the measurements and/or other data for, about, or from the air-handling unit 12. The data is received in response to a query, by loading from the memory 26 or memory 16, by pushing from the controller 14, or other process.

For modeling, the cloud server 24 may be configured to derive one or more characteristics from the measurements. Any of the analytics discussed herein may be derived. For example, diversity for operation of a fan is calculated. Other characteristics may be the mass flow based on fan speed and pressure measurements. The model itself may allow for input of the fan speed and pressure without the derived mass flow or the mass flow is derived and used as an input feature in the model. The server 24 collects measurements, calculates derived characteristics, and/or looks up features or specifications. The information used as inputs to fit the model 28 and/or to model outputs given inputs with the fit model 28 are collected.

The server 24 is configured to identify an operational parameter for the air-handling unit 12 by solving the heuristic model using the measurements and other data. The operational parameter is a set point or other setting that the controller 14 may control. The operational parameter is a variable for the air-handling unit 12, so a value of that variable may be used to alter or effect the operation of the air-handling unit 12.

The server 24 loads the model 28 from the memory 26 and solves for the given or specific air-handling unit 12. The solution fits the heuristic model 28 to the air-handling unit 12. The measurements, derived characteristics, and/or other data are used to represent the boundary conditions or inputs for the model 28. The server 24 uses the fit model 28 to determine adjustments or values of variables in the model 28 to best control the air-handling unit 12.

For a machine-learnt classifier, the input features are acquired. By applying the input features to the classifier, the classifier solves for the specific air-handling unit 12. The resulting outputs represent the expected outputs given the input feature. By iteratively adjusting the inputs, such as associated with a fan operation, probability distributions or other settings are output. The classifier may be trained to output optimal settings (e.g., for reduced energy usage) to be used, or probability distributions of outputs given input variation may be used to select the settings using any cost.

For the physics-based model, the server 24 solves by iterative optimization. An optimization is applied to the model, such as neighbor searching and/or local minimization. In an iterative approach, the energy usage may be minimized using the optimization of the model. Alternatively, the variation calculus may be used as part of the minimization of energy usage using the fit model 28. The resulting control values are determined and applied. Based on the application, further measures are provided to further optimize using the physics-based model.

The server 24 is configured to output the operational parameter or parameters. The control parameters, such as set points, to be used by the controller 14 are output to the controller 14. The parameters are provided over the network 22.

In one example, an air-handling unit 12 consumes energy. Various operational measures are gathered from the HVAC system associated with the air-handling unit 12. Other information may be derived from the measurements. This gathered information specific to a given HVAC system is used by the server 24 to provide a set of control parameters to be used in operation of the HVAC system. This cloud-based server 24 determines the control parameters for the air-handling unit 12 using a heuristic approach rather than a rigorous optimization based on rules. Machine learning and/or iterative fitting processes are applied to determine the values of the control parameters for the air-handling unit 12. Load, temperature, cost, mass flow, and/or other information may be used in the analysis. The set points provided to the controller 14 may be any, such as damper position or fan speed. Using a model of the HVAC system, the optimal fan operation for a given cost function is determined.

In addition to or as an alternative to optimizing control using the heuristic model, the server 24 or the computer 30 performs analysis of the operation of the air-handling unit 12. The analysis is of the air-handling unit 12 as an individual component or within an overall HVAC system (e.g., tens of air-handling units in a floor or entire building). Data analytics for monitoring ongoing operation, predicting maintenance or further problems, identifying design flaws, determining variation from design or specification, or identifying opportunity (e.g., more efficient operation with reassignment of zones) is provided.

The computer 30 is a workstation, personal computer, tablet, smart phone, or other processing device. The computer 30 receives output from the air-handling unit 12 and/or the cloud server 24. For example, the computer 30 is a HVAC workstation that manages or monitors operation of an HVAC system including the air-handling unit 12. As another example, the computer 30 is a personal computer or a server.

The computer 30 includes the display 32 for displaying analytic information, such as a graph, value, or recommended remediation. The display 30 may additionally or alternatively display measurements, data, settings, or model information.

FIGS. 3 through 11 represent example analytics. The data from or about the air-handling unit 12 are used to analyze operation of the air-handling unit 12. Other examples may be provided. By processing data used for control and/or data acquired but not used for control, problems or opportunities for the HVAC system and/or the air-handling unit 12 are identified.

Figure 3:
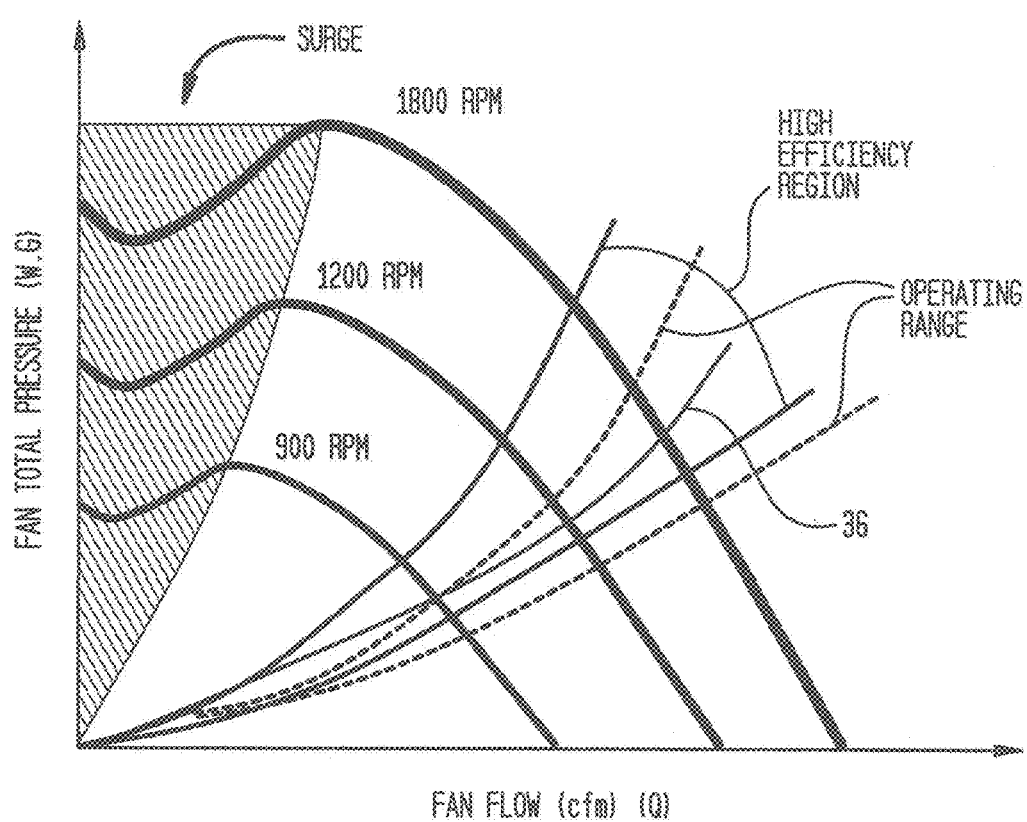
FIG. 3 shows a graph of information used for an efficiency of operation analytic.

FIG. 3 illustrates an example of total fan pressure as a function of fan flow. Three curves representing pressure as a function of flow at different fan speeds (revolutions per minute (rpm)) are shown. A surge region exists where the same fan total pressure occurs for two different fan flows (cfm). The surge region creates ambiguity in operation where a rule-based system may end up operating in an undesired way. Two solid lines show a range of operation with the greatest efficiency. Dashed lines represent the typical range of operation for a given fan 18. Some of the operation is out of the range of most efficient operation. The line 36 represents a demand flow system curve. The demand flow curve provides an ideal operation for the fan 18 based on modeling. The example of FIG. 3 is for a given fan 18. Other fans 18 may have different ranges of efficiency, surge regions, or other operation.

For analysis, the performance of the fan 18 may be determined. For example, the demand flow curve 36 for the fan 18 is determined. Efficiency may be calculated as a ratio of power delivered by the fan to the power input to the fan. If the fan 18 is losing efficiency, then maintenance of the fan 18 may be scheduled. Forward detection and diagnostics may be performed to fix the efficiency.

If the fan 18 operates at maximum capacity a sufficient amount of time or number of times, then replacement of the fan 18 with a larger fan 18 may be scheduled. The fan capacity may be forecast. The operation of the fan 18 over time may be tracked to identify trends in capacity or amount of use, such as with regression analysis. If the fan 18 is expected to reach capacity by a given time, then maintenance or replacement may be scheduled prior to that given time.

Energy consumption may be determined so that savings may be measured and verified. The energy may be calculated by dividing the product of flow and pressure by efficiency.

The analytics rely on fan flow, fan total pressure, power input (e.g., in KW from the variable speed drive), and fan rpm. Additional, different, or fewer measurements and corresponding sensors may be used.

Figure 4:
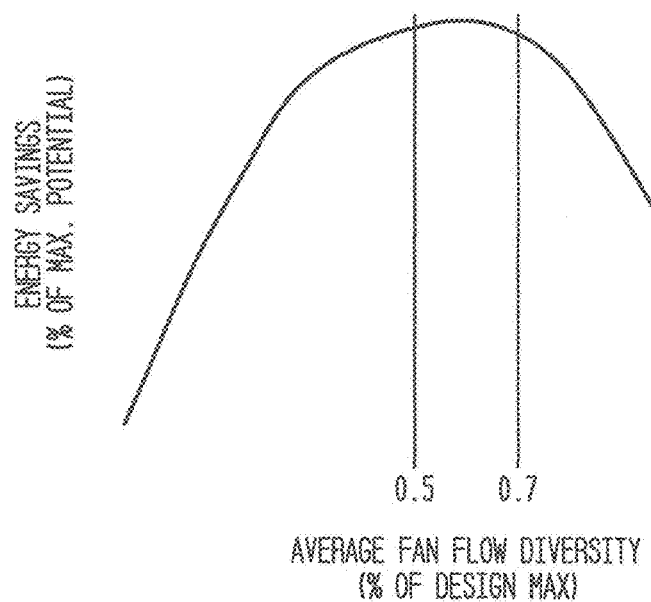
FIG. 4 is an example flow diversity graph.
Figure 5:
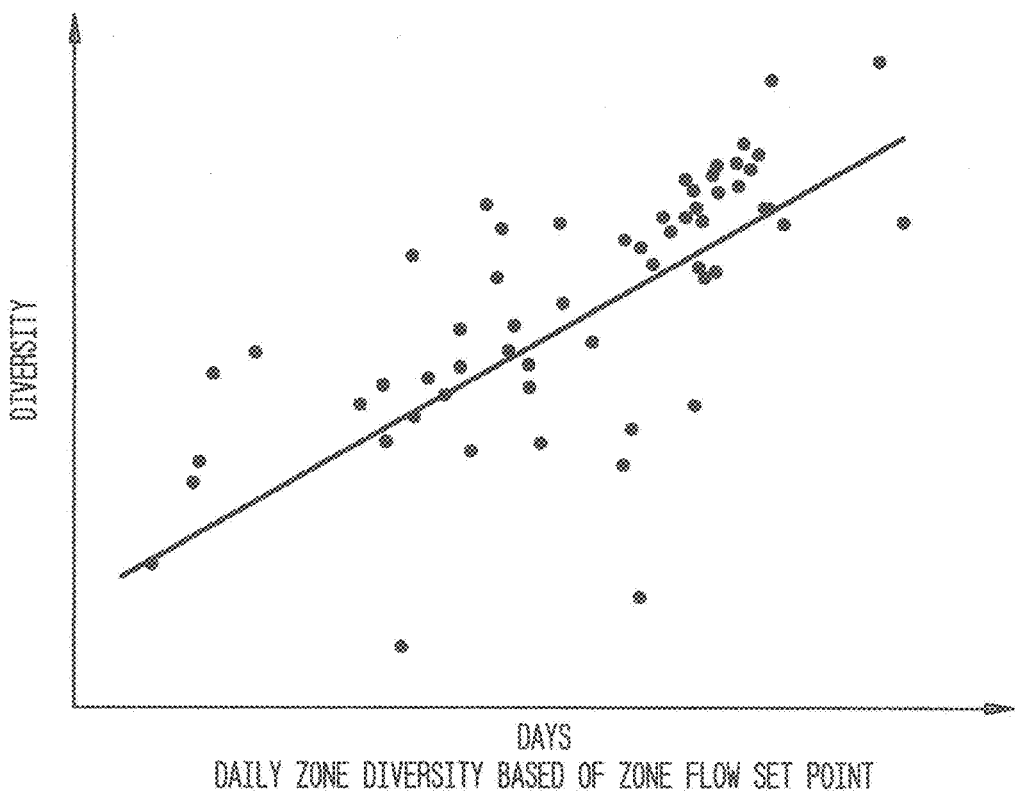
FIG. 5 is an example trend in diversity over time.

FIGS. 4 and 5 illustrate another example of analytics determined by the computer 30 or the server 24. The analytic is the diversity, which may indicate a mismatch of the fan capacity with a zone or occupant space. Diversity is a measure of variance of operation. FIG. 4 shows the energy savings or percentage of maximum potential savings as a function of average fan flow diversity. For diversity of fan flow, the fan flow set point and the maximum design flow for the fan 18 are measured or acquired. Additional, different, or fewer operating parameters may be used.

In the example of FIG. 4, the diversity is in the fan flow, but diversity in other operating parameters (e.g., speed, capacity, efficiency, or others) may be determined. The example is diversity for a given fan 18, but the diversity for a zone over any period may be used in other embodiments. A zone or fan 18 with low diversity may indicate that the fan 18 or fans are overly large. For cost savings, a smaller fan 18 may be used or zones may be reassigned for more efficient distribution of fan power. As another example, a zone with low diversity may indicate occupant areas best for placing new or moving employees. Placing another employee in a zone or area with high fan diversity more likely drives the fan 18 to operate at capacity.

In the example of FIG. 5, a trend or change over time in zone diversity as a percentage of the designed maximum fan flow is determined. The operation of the fans (e.g., single verses dual) may be controlled to achieve an optimum or learnt diversity. The zone diversity trends may be analyzed for space usage and used for planning. For example, an increase in diversity indicates a need for a larger fan. As another example, a decrease in diversity indicates that one fan of a dual fan air-handling unit may be shut off or not used.

Figure 6:
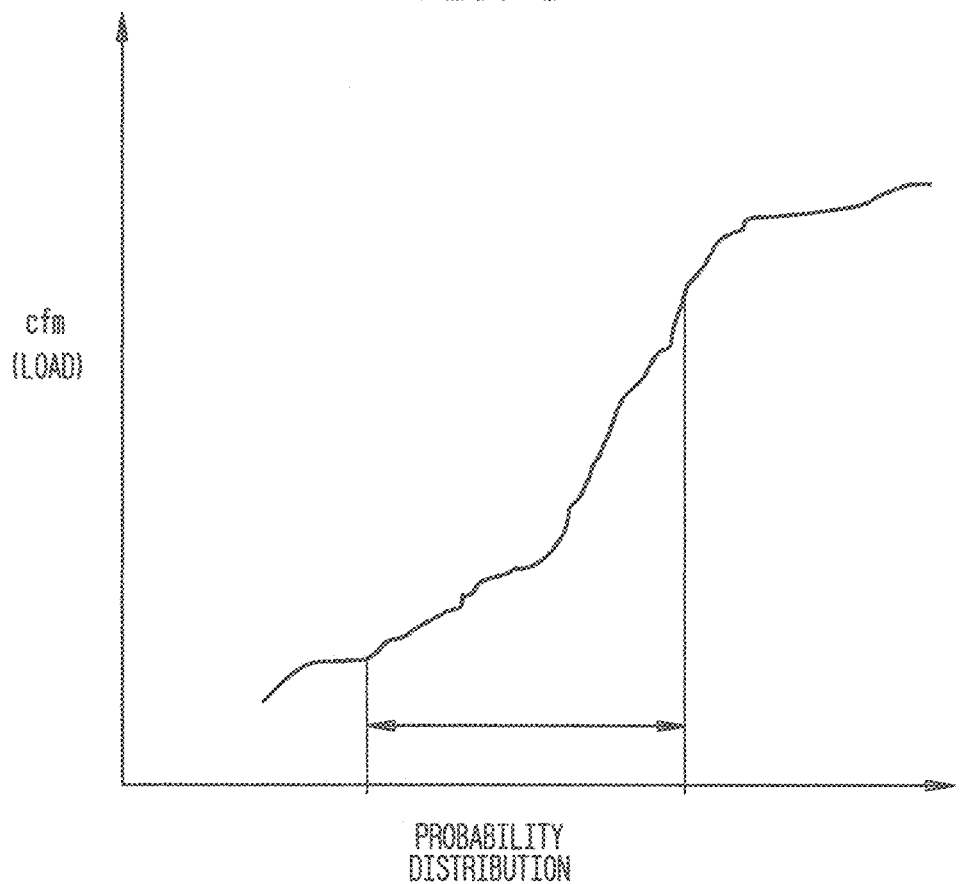
FIG. 6 shows an example distribution of air flow.

FIG. 6 shows another example analytic. The cloud server 24 or computer 30 determines a susceptibility of the air-handling unit 12 to the outdoor conditions based on a relationship between the outdoor conditions and operation of the air-handling unit 12. For example, the fan flow set point, fan maximum design flow, outdoor temperature, outdoor wet ball/relative humidity, and/or other data is measured. Additional, different, or fewer types of data may be measured.

The fan flow or other operational parameter is correlated with the outdoor temperature or other outdoor data. This analytic shows the relationship or to what extent the fan flow is due to outdoor temperature. The analysis uses correlation, probability distribution or other analysis from the measured data to perform load analysis (e.g., ventilation verses outdoor driven loading) and/or to reduce ventilation based on occupancy. As a result, zones or fans 18 particularly susceptible to outdoor conditions may be identified and fixes established. For example, glazing is fixed, shades are added or used, or insulation is added. By isolating susceptible fans 18, the fixes may be localized (e.g., by fan or zone), reducing cost. Analyzing the correlation by time may indicate the appropriate fix, such as a high correlation during the morning indicating sun light as driving load. Occupancy decisions may be made based on the analytic. The load or fan flow may be reduced by altering occupancy, resulting in avoiding high loads in zones susceptible to outdoor conditions.

FIG. 6 shows the load or fan flow (cfm) as a function of probability distribution of correlation with temperature. The probability distribution is of temperature as a function of time. For example, 5% of the time, the temperature is in the 90-95 degree F. range. FIG. 6 relates the fan flow to the temperature distribution. FIG. 6 shows a 90% chance (range between vertical lines) that the hourly average flow will be between 20200 and 22000 cfm. Some example statistics that may be used include minimum (e.g., 18,100 cfm), maximum (e.g., 22,700 cfm), mean (e.g., 21,000 cfm), and standard deviation (e.g., 570 cfm) of the temperature and an average airflow rate for each.

Figure 7:
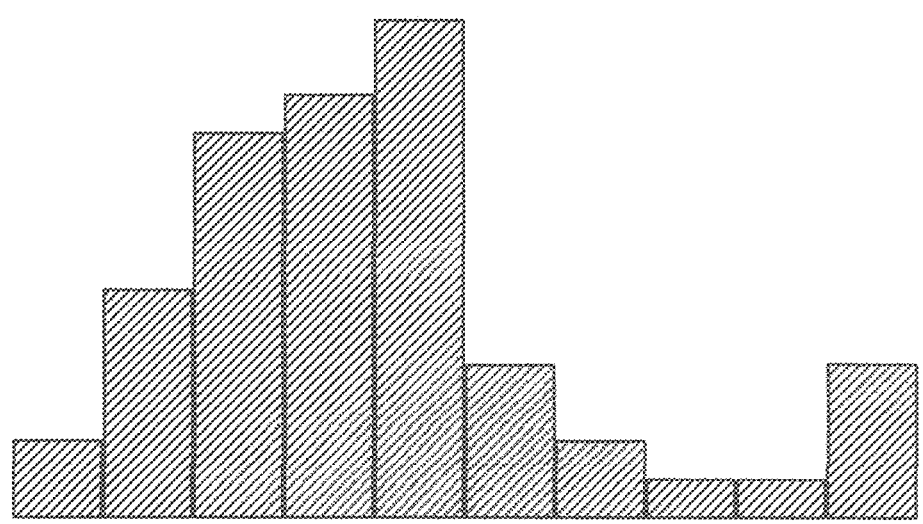
FIG. 7 shows a plot of a number of boxes as a function of percentage of maximum flow according to one example.
Figure 8:
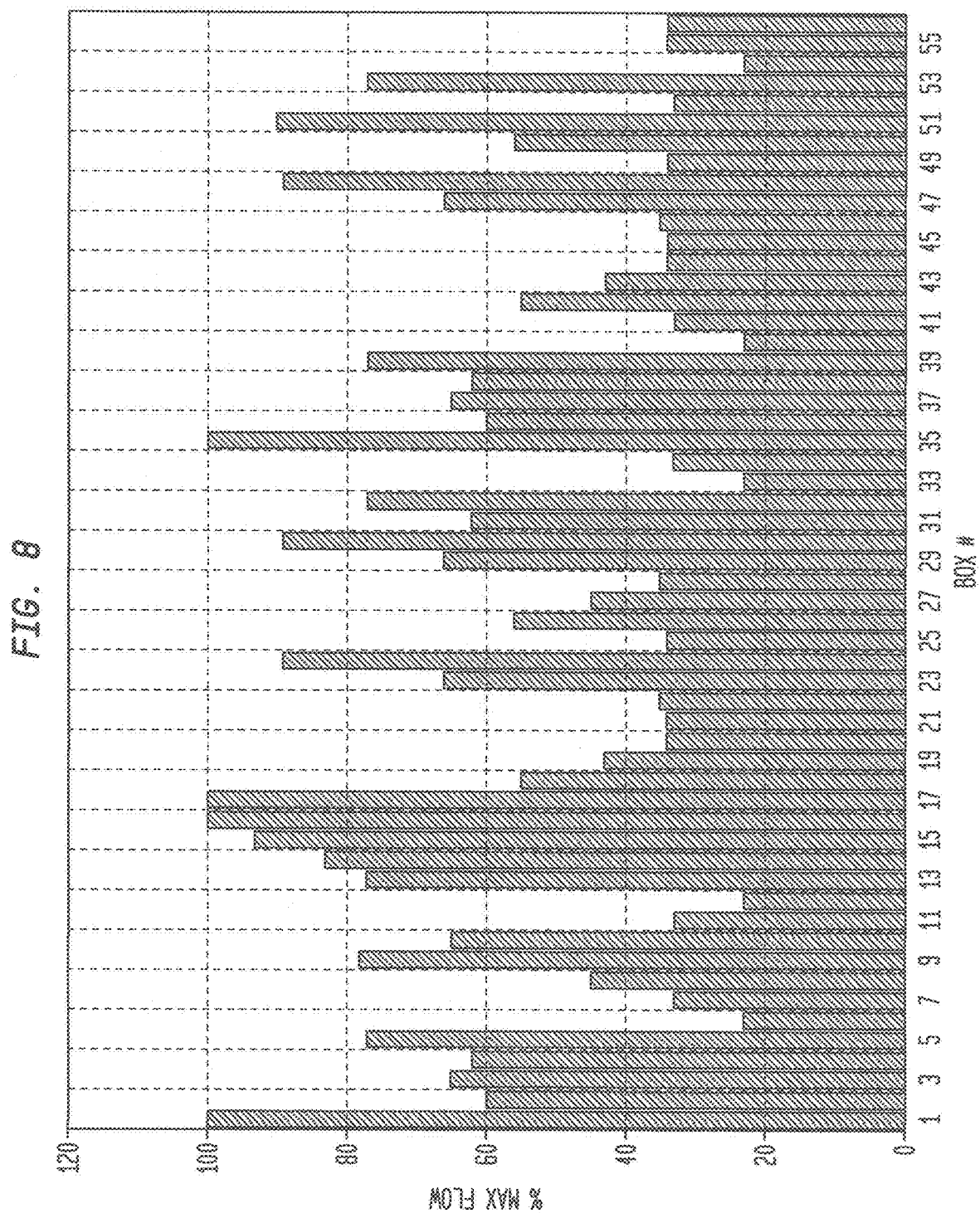
FIG. 8 is an example plot of a percent of maximum flow as a function of box.
Figure 9:
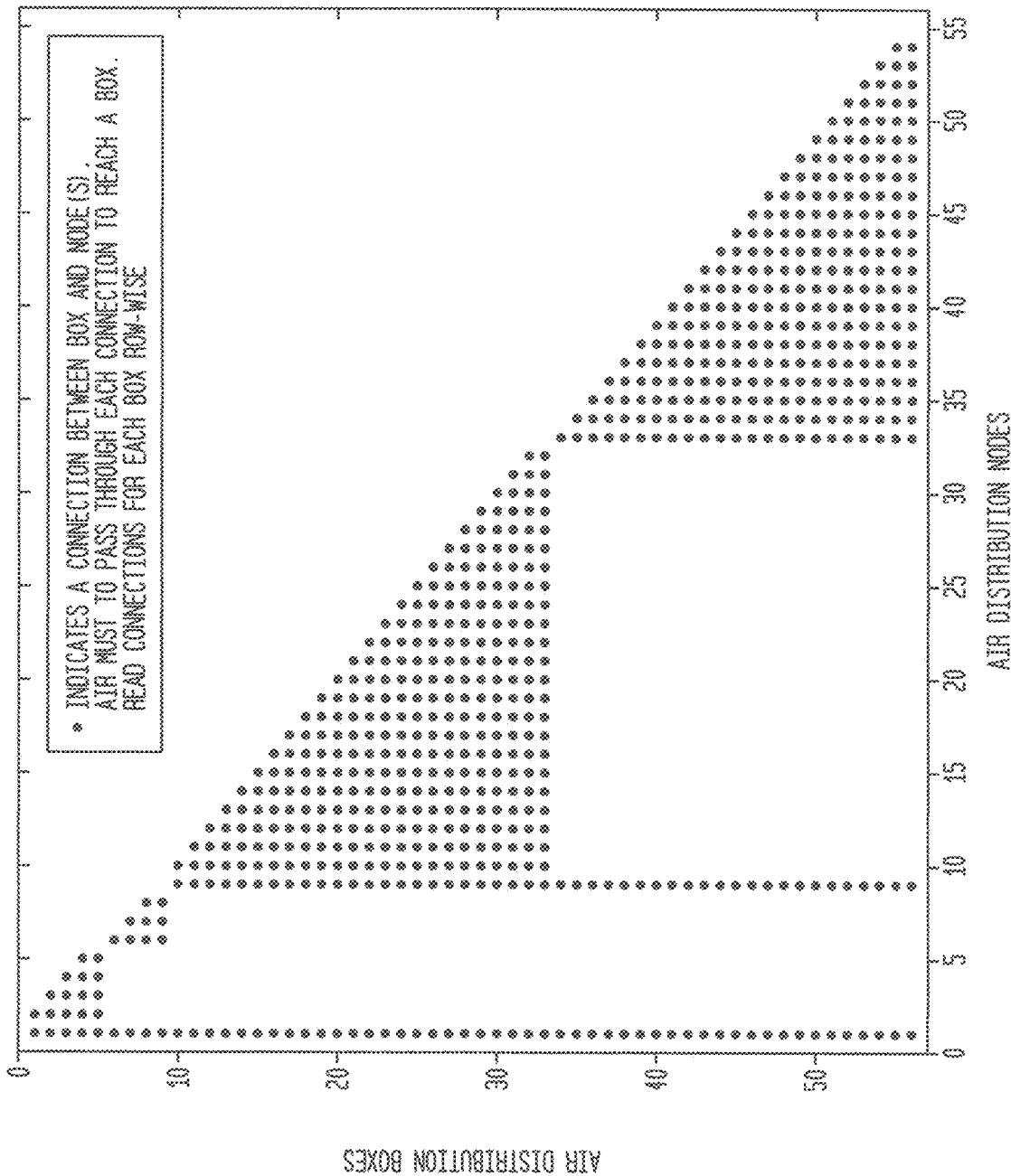
FIG. 9 is a plot in one example of interconnection of boxes in an air distribution system.
Figure 10:
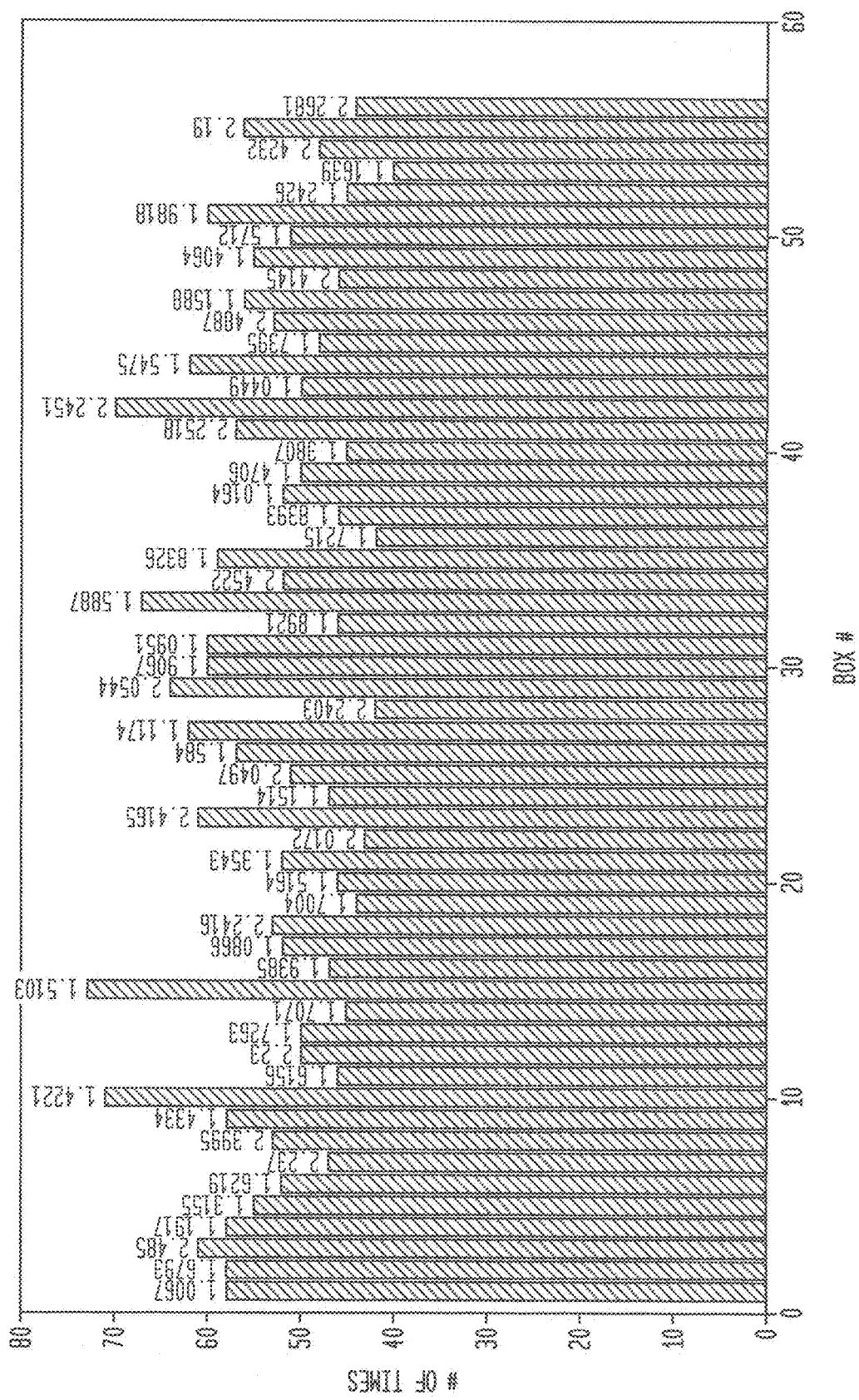
FIG. 10 is an example of a graph of number of times of actuator repositioning by box.
Figure 11A:
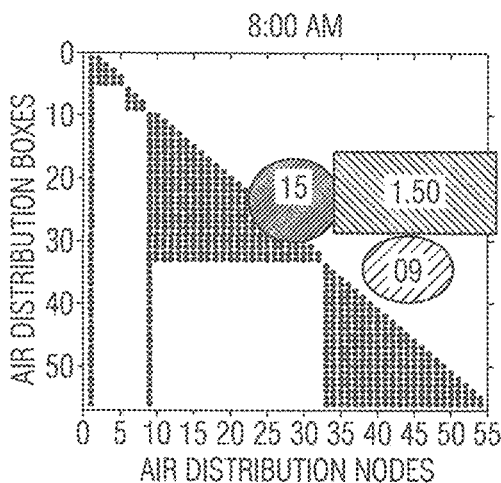
FIGS. 11A through 11I illustrate determination of critical and maximum flow zones and pressure as a function of time.
Figure 11B:
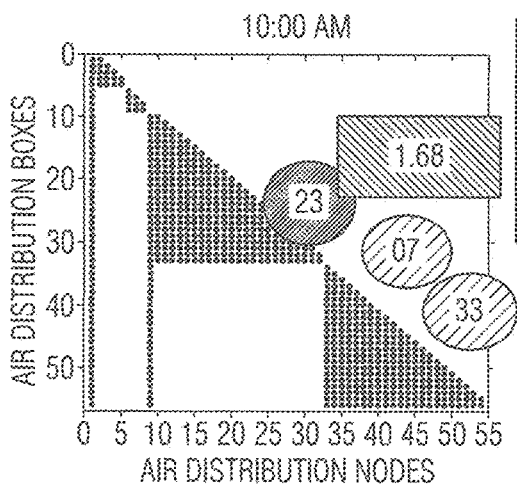
Figure 11C:
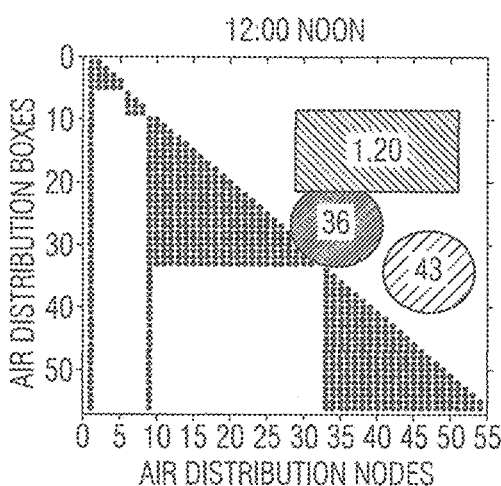
Figure 11D:
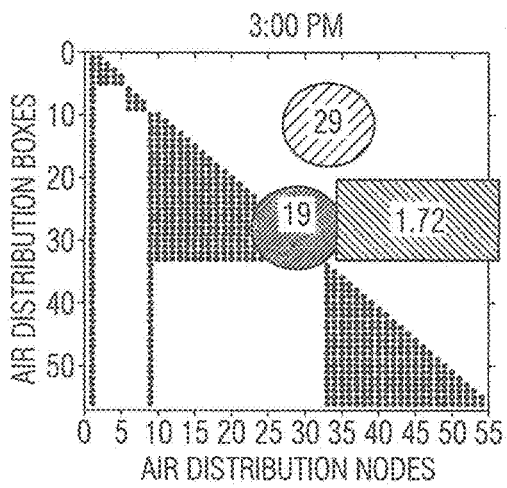
Figure 11E:
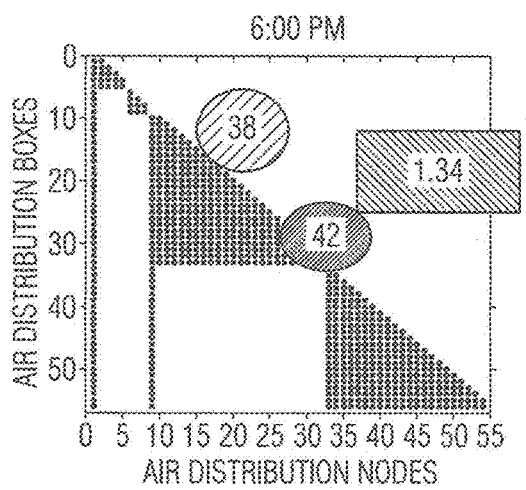
Figure 11F:
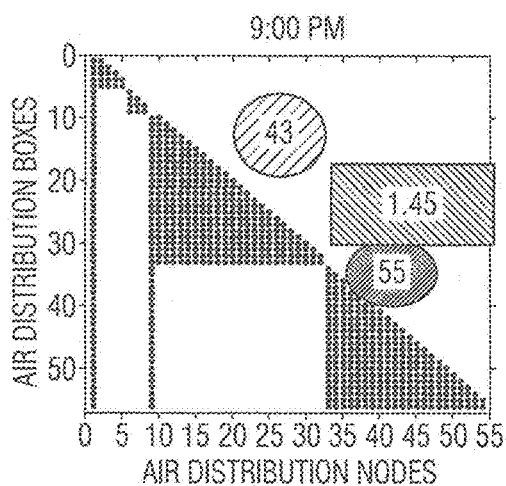
Figure 11G:
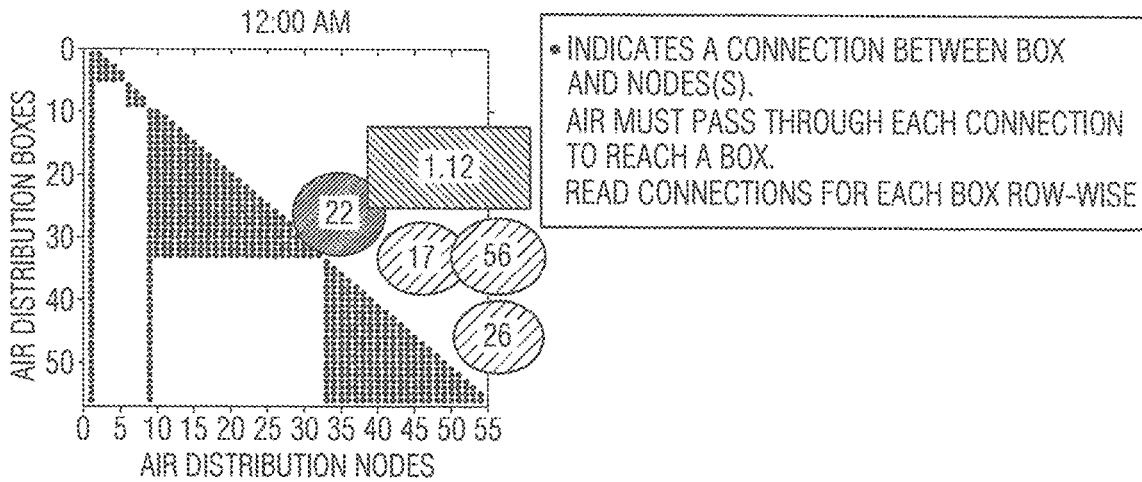
Figure 11H:
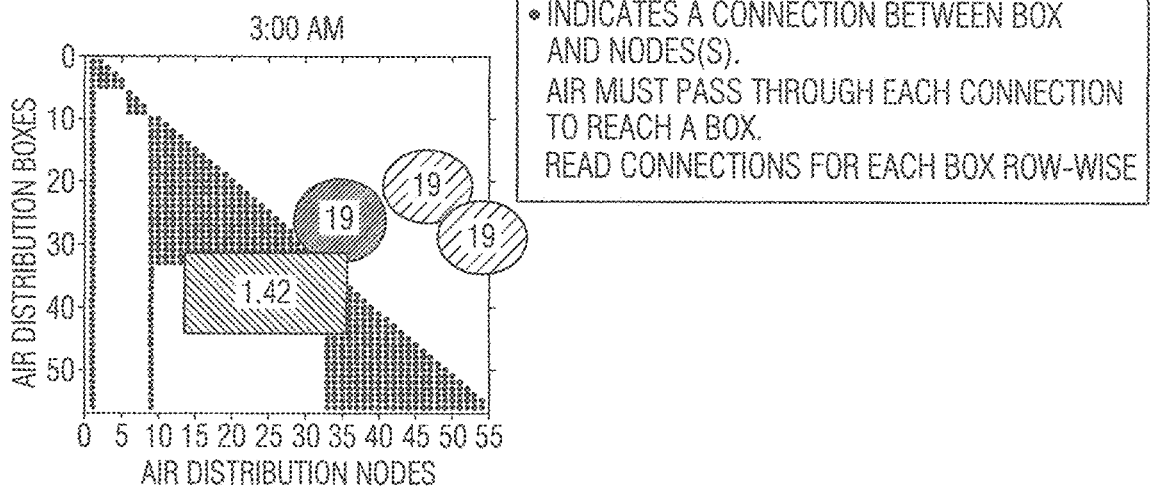
Figure 11I:
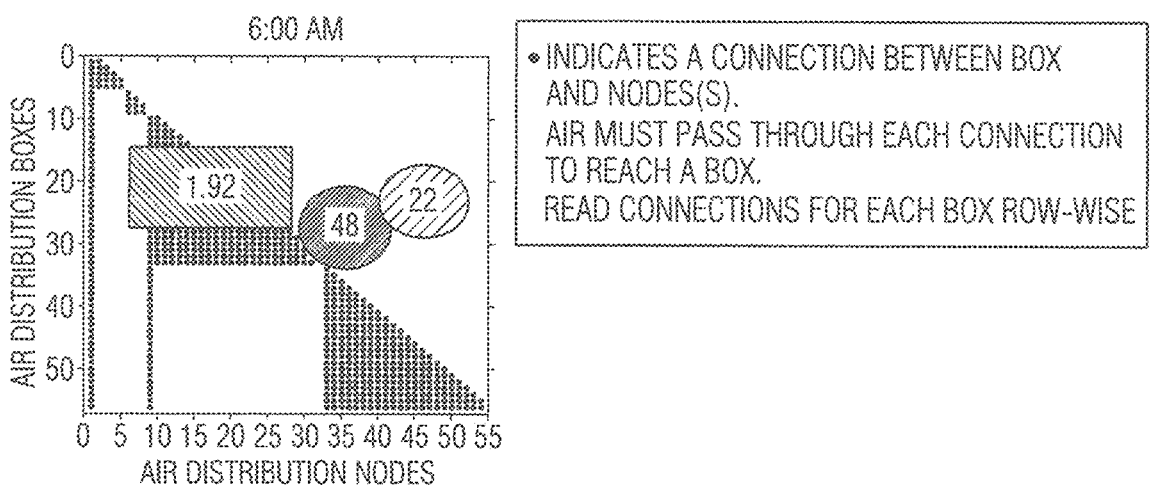

FIGS. 7-10 show example analytics including dynamic flow or dynamic pressure performance. FIG. 7 shows a graph of the number of boxes (i.e., fans 18 or air-handling units) (y-axis) as a function of percentage of maximum flow for a given time. FIG. 8 shows the percentage of maximum flow by box. FIGS. 7 and 8 are shown for a given time. The change over time may be determined. FIG. 9 shows physical relationships for air distribution boxes. 55 boxes are provided in this example. Each dot is a connection between a given box and an air distribution node or zone. For example, box 34 is connected to nodes or boxes 1, 9, and 33, such as receiving air from those nodes. The flow or pressure at one box is based, at least in part, on the flow or pressure in the related or connected boxes. A given box may need a particular pressure, so the upstream-connected boxes supply that pressure. FIG. 10 shows a number of times of actuator repositioning in a given period by box number.

The box flow set point may be used to analyze the dynamic flow distribution from box flow set points and/or the dynamic pressure requirement for each box. Critical and/or rogue zones may be identified. A rouge zone may have a box requiring the maximum pressure. By finding the cause of the maximum pressure demand and fixing the cause, energy savings may result. A critical zone may be zone operating with higher-pressure demand. By finding critical zones, fixes may be determined and energy savings may result. The variance per box or boxes closer to or furthest from maximum flow may be identified for altering the air distribution to avoid wear and tear on the boxes.

In one embodiment, the box flow set point and box actuator repositioning are measured. The rogue or critical zones are determined based on a number of actuator re-positioning, box pressures, and box flow. Any function combining these variables may be used. The distributions of box pressure requirements, box flow requirements, and actuator repositioning may be analyzed to forecast service requirements, for proactive service and preventative failure, to reduce downtime, to avoid comfort complaints, and/or to extend equipment life (maximum pressure operation may shorten life).

FIGS. 11A through 11I show other examples where the variation in pressure, critical zone, and maximum flow zone over time is analyzed. The same interrelationship of boxes as shown in FIG. 9 is used. For each sample time (e.g., every two-three hours), the zone with critical pressure is identified (e.g., box 15 at 8:00 am), the zone or zones with maximum flow are identified (e.g., boxes 17, 56, and 26 at 12:00 am), and the pressure for the critical zone is identified (e.g., 1.50 at 8:00 am). A pressure range or other information per box or for any critical or rogue boxes may be identified. In the coupled zone operation, the cloud server 24 or computer 30 determines the relationship or coupled zone from a HVAC system configuration, such as represented in FIG. 9. The dynamic pressure, flow or other requirement over time is determined.

The dynamic pressure and/or flow for critical zones and/or pressures may be used to predict maximum flow zones. A regression analysis may be used to establish trends over any period. Comfort analysis may be predicted. Lower pressures may indicate comfort while higher pressures may indicate the airflow not meeting occupant demand. Design flaws or other trouble shooting may be provided. Box sizes and maximum flow values may be estimated in order to identify zones needing a larger box or fan 18. The maximum flow of each box may be compared to a design specification for the HVAC system or to the box design to identify boxes operating near a maximum.

In another example analytic for dynamic flow and/or pressure, the zone or box coupling with temperature, flow, or temperature and flow is determined. Analytics may be performed for the coupled zone dynamic flow/pressure and comfort performance. The air distribution nodes mapped to air distribution variable air volume boxes are found for a coupled zone. The box flow set point, zone temperature, temperature set point, actual flow, and a count of the actuator repositionings are measured. The coupling of the pressure and flow with temperature is analyzed, such as noting a box at maximum flow and looking up the temperature measured for the zone to determine whether the box is sufficiently controlling the temperature. The application of energy balance (i.e., the flow sufficient to satisfy the temperature set point where a trend in performance shows if the balance is correct) for each zone and/or flow and comfort performance may be analyzed. The analysis provides values for the zone-based dynamic first principle forward detection (i.e., zone fault due to not satisfying temperature set point or showing something being wrong) and diagnostics, detection of dynamic trends (e.g., morning verses afternoon trends), and/or offers predictive service and improves comfort and energy performance.

Figure 12:
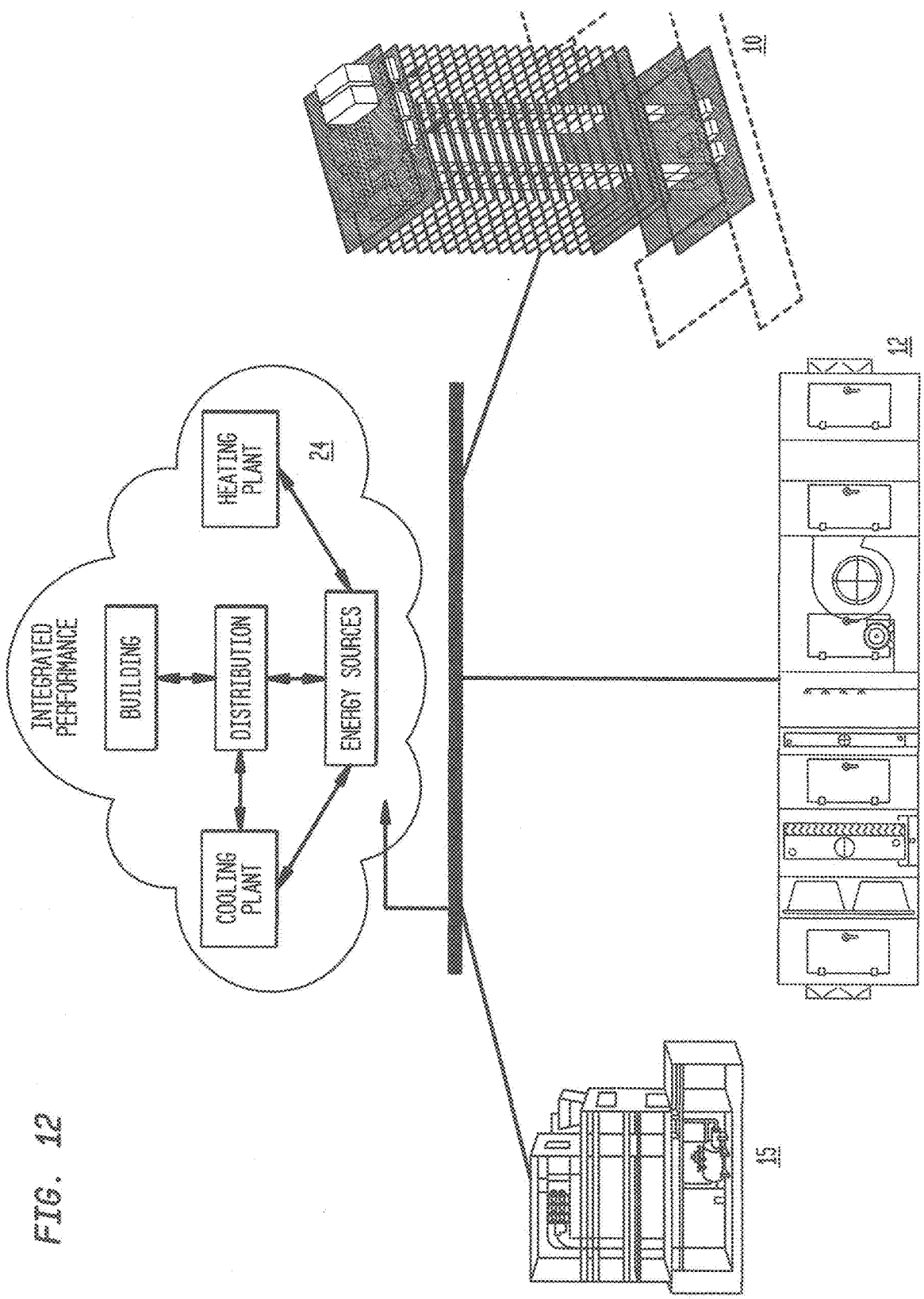
FIG. 12 illustrates performance analytics integration for air-handling, plant, and controlled zone.

FIG. 12 shows integration of supply and demand side information in performance analysis. The analytics performed by the cloud server 24 is linked to supply side of energy distribution, such as the cooling and heating plants 15, on one hand and on the other, is linked to demand side, such as the zone or space side of the building 10. Using communication to and/or from any of the air-handling unit 12, zone of the building 10, and/or plant 15, the air-handling model may be expanded to include analytics as a hub for global performance.

In one embodiment, outdoor sensors, zone or space sensors for the part of the building to which the air-handling unit 12 provides air, sensors from the air-handling unit, and/or plant sensors provide information used in the modeling and/or analytics. For example, the temperature, relative humidity, and volume for outdoor air being drawn into or provided the air-handling unit are measured for the outdoor and zone information. The chilled and hot water temperature for supply and return and mass flow for supply and return are measured for the plant. The fan power, temperature of supplied air, and relative humidity of the supplied air are measured for the air-handling unit 12. Additional, different, or fewer measurements and corresponding sensors may be provided.

The model is expanded to include the different sources of information. The physics for the plant and/or zone(s) may be added. The values for the variables may be included as features used in the machine-learning and subsequent application using the machine-learnt model. The heuristic model is then used for analysis and/or control. The provided information may be used for any analysis, such as those discussed herein or other analysis. By integrating the values for additional variables outside the air-handling unit 12, further analysis for assisting in maintenance, design, planning, and/or operation may be provided.

In one embodiment, the analytics provided by the cloud server 24 include analysis of the zone and/or space performance variables to trigger investigation of plant performance variables, or vice versa. In another embodiment, analytics by the cloud server 24 analyzes zone and/or space performance variables to trigger investigation of air-handling performance variables and vice-versa. The investigation may be by a model, such as a heuristic model, or other analysis. The analysis of the related system or variables may lead to different operation, such as automated change based on a model, may lead to output of information to be used by a designer or other person (e.g., maintenance planning), and/or may result in a warning or indicator of possible improvement.

FIG. 13 shows one embodiment of a method for modeling HVAC. The method is implemented by the system of FIG. 1, the system of FIG. 2, the controller 14, the server 24, the computer 30, or other devices. For example, the server performs all of the acts. The performance relies on communications with the air-handling unit 12 and/or the controller 14.

The method is performed in the order shown or other order. For example, act 58 is performed prior to act 56. Additional, different, or fewer acts may be provided. For example, act 58 is not performed.

In act 52, the server 24 optimizes a model 28 of air handling in a HVAC system based on measurements from sensors 20. The sensors 20 and other sources of data provide information used by the server 24. The server 24 fits a heuristic model 28 to the data, such as fitting a physics-based model. Neighbor searching, local minimization, or other iterative solution is used to fit the model to the data and/or to determine optimum outputs from the fit model. Alternatively, the server 24 models the air handling with a machine-learnt classifier. The data is input to the classifier to provide learned results given the set of inputs. The machine-learnt classifier classifies based on the measurements and other input data.

In act 54, the server 24 determines the settings of the air handling in the HVAC system. The model 28 is optimized to fit with the operation of the air handling. This model 28 is used to determine the settings for one or more operational parameters of the air handling, such as to determine set points for fan speed. The fan speed likely to provide the desired comfort while minimizing cost may be determined. For example, variance in output results as a function of variance in the input or inputs is determined using the model. By applying a cost function, such as minimum energy input to provide the desired comfort, a setting for one or more controlled settings is determined. In one embodiment, all of the settings are determined together to minimize the cost function using the model 28.

In act 56, the settings are transmitted to the HVAC system, such as transmitting the settings over the network 22 to the controller 14. Any transmission format may be used. The transmission provides the settings to be used by the controller 14 for operating the HVAC system.

In act 58, the server 24 calculates an analytic showing a problem or opportunity for the air handling of the HVAC system. Any of the analytics discussed herein or other analytics may be calculated. The analytic provides information indicating the problem or opportunity. For example, the analytic shows a trend that may result in failure or insufficient operation of the air handling. As another example, the analytic may show a zone or areas for occupancy without having to reconfigure the HVAC system.

The analytic is output on the display 32. The user may use the analytic to make decisions, such as maintenance scheduling, cost savings verification, occupancy placement, replacement, reassignment, reconfiguration, or other remediation.

FIG. 14 shows one embodiment of a method for analytics in HVAC. The method is implemented by the system of FIG. 1, the system of FIG. 2, the controller 14, the server 24, the computer 30, or other devices. For example, the controller 14 uses sensors 20 to perform act 60 and then performs act 62. The server performs acts 64, 66, and 68. The performance relies on communications with the air-handling unit 12 and/or the controller 14.

The method is performed in the order shown or other order. For example, act 68 is performed prior to act 64 and/or 66. Additional, different, or fewer acts may be provided. For example, act 68 is not performed.

In act 60, the sensors 20 measure operation of the air handling in the HVAC system. For example, fan speed, pressure, power input and/or flow are measured. Other operational parameters may be measured. The controller 14 may collect or store additional information, such as set points or design specifications (e.g., maximum mass flow).

In act 62, the measurements and/or other data are transmitted to a processor, such as a processor of the server 24 or the computer 30. The transmission is of any of the data at once or over time. The transmissions for later times may transmit just data that has changed. The transmission is wired or wireless. The transmission is direct or over a network. In one embodiment, the transmission is by access or looking up the data by the server 24 in a memory.

In act 64, the processor (e.g., server 24 or computer 30) analyzes the operation of the air handling. The measurements and/or other data, such as the fan speed, pressure, power input, and/or flow, are analyzed. The analysis provides a recommendation for remediation, a graph, a chart, data, or other information that an operator may use for various purposes. The information may show a problem or opportunity. The problem or opportunity is highlighted with the information or the information may be provided and the user relied on to identify the problem or opportunity from the information.

For analysis, one or more statistics are calculated. Alternatively or additionally, a formula or formulas are used to calculate the analytic information. Regression or other analysis may be used to identify trends.

In act 66, the information, including any problem and/or opportunity, are presented on a display 32. The results of the analysis are presented to the user. The problem or opportunity are specifically identified, such as indicating a box to be replaced, a zone for increased occupancy, confirmation of cost savings, correlation with outdoor conditions, trend indicating a need for maintenance or adjustment, or other information. Alternatively or additionally, a graph, chart, or data are displayed for user interpretation.

In act 68, the operation of the air-handling unit 12 is modeled with a heuristic model 28. The server 24 models the operation using the model 28 and the measurements and other data. The model 28 is used to determine settings to be used in controlling the air-handling unit 12. The settings are transmitted to the air-handling unit 12 or the controller 14 for implementation.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for modeling heating, ventilation, and air conditioning (HVAC), the method comprising:
   optimizing, by a server, a heuristic model of air handling in a HVAC system based on measurements from outdoor sensors, building space sensors, plant sensors, and sensors for the air handling;
   determining, by the server, settings of the air handling in the HVAC system from the optimized heuristic model, wherein determining the settings of the air handling in the HVAC system includes:
      determining a diversity from a fan flow set point and a fan designed maximum flow; and
      indicating a mismatch of a fan with a space based on the diversity; and
   transmitting the settings to the HVAC system to control the HVAC system.

2. The method of claim 1 wherein the heuristic model comprises a physics-based model, and wherein optimizing comprises iteratively solving with neighbor searching or local minimization of the physics-based model.

3. The method of claim 1 wherein the heuristic model comprises a machine-learnt classifier, and wherein optimizing comprises classifying with the heuristic model based on the measurements.

4. The method of claim 1 further comprising calculating, by the server, an analytic showing a problem or opportunity for the air handling of the HVAC system, a plant, or a controlled zone.

* * * * *